United States Patent [19]
Reynolds

[11] 3,992,603
[45] Nov. 16, 1976

[54] NARROW GAP WELDING TORCH

[75] Inventor: Richard W. Reynolds, Hazelcrest, Ill.

[73] Assignee: Welding Research, Inc., Chicago, Ill.

[22] Filed: May 31, 1974

[21] Appl. No.: 474,972

[52] U.S. Cl. .................................. 219/136; 219/74; 219/130
[51] Int. Cl.² ......................................... B23K 9/16
[58] Field of Search ................ 219/61, 130, 73, 74, 219/136, 137, 126, 60 A

[56] References Cited
UNITED STATES PATENTS

| | | | |
|---|---|---|---|
| 2,827,550 | 3/1958 | Unrath | 219/74 X |
| 2,868,951 | 1/1959 | Shrubsall | 219/74 |
| 3,123,702 | 3/1964 | Keidel et al. | 219/74 |
| 3,172,992 | 3/1965 | Keller | 219/130 |
| 3,239,648 | 3/1966 | Syrigos | 219/74 X |
| 3,243,571 | 3/1966 | Schmerling | 219/130 |
| 3,536,888 | 10/1970 | Borneman | 219/136 X |
| 3,697,721 | 10/1972 | Robba et al. | 219/136 |
| 3,746,833 | 7/1973 | Ujiie | 219/130 X |
| 3,826,888 | 7/1974 | Garfield et al. | 219/136 X |

*Primary Examiner*—J. V. Truhe
*Assistant Examiner*—Clifford C. Shaw
*Attorney, Agent, or Firm*—Julius L. Solomon

[57] ABSTRACT

This invention relates to a welding torch for practicing the gas metal arc process in the welding of thick square edged plates which are separated by a narrow gap. The torch includes a heat resistant tube for providing electrical contact with the moving wire, means for removing heat rapidly from the end of the torch, heat and electrical insulating means surrounding the contact means, and means for preventing weld spatter from adhering to the insulating means.

7 Claims, 4 Drawing Figures

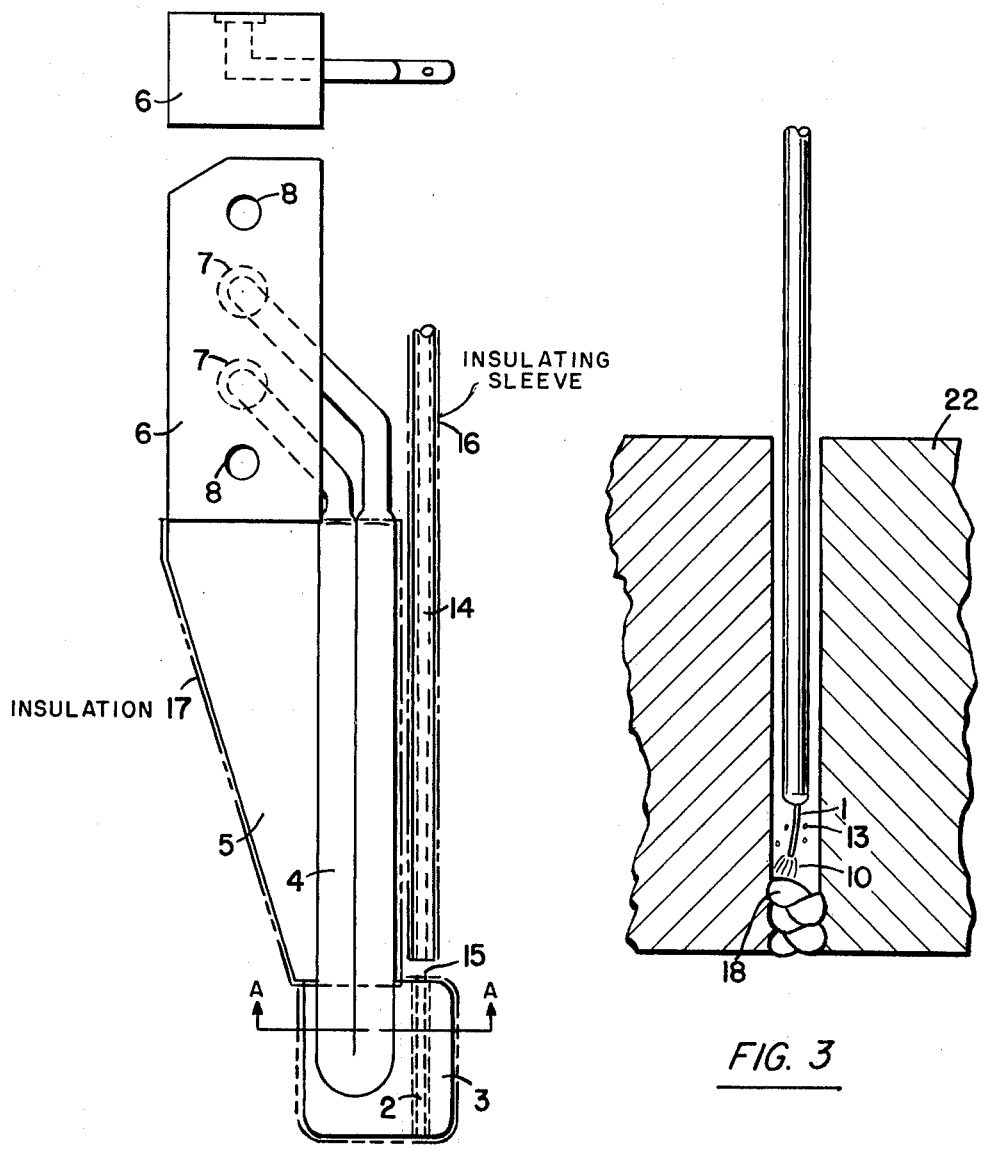
FIG. 1
FIG. 3
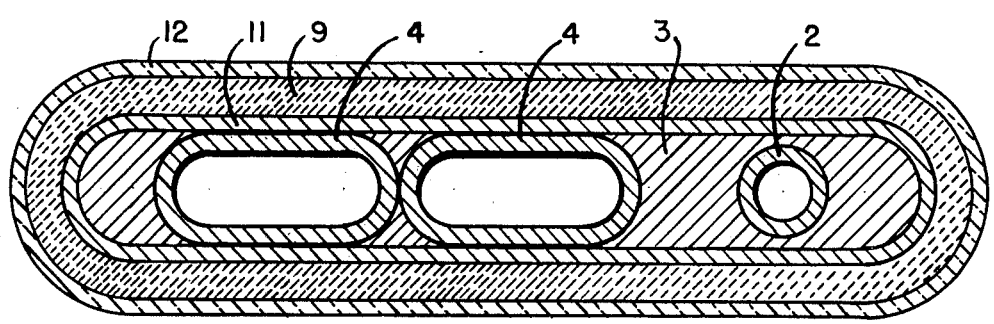
FIG. 2

NARROW GAP WELDING TORCH

This invention relates to apparatus used in conjunction with the gas metal arc welding process and, more specifically, to a welding torch for practicing the Narrow Gap Welding Process.

The gas metal arc welding process is an arc welding process wherein coalesence is produced by heating with an electric arc between a consummable filler arc. During the welding electrode and the work. In this process the consummable electrode is in the form of a wire which may have a diameter generally from 0.020 inch to ⅛ inch and in some cases more. The wire is continuously fed from a wire reel and is delivered from there by means of a wire drive through an electrode holder which also guides a shielding gas to the work area in order to prevent oxidation of the hot metal in the area being welded and to provide the proper ionized gas electrical characteristics for the welding arc process it is necessary that the wire be directed properly to the exact spot at which the welding is desired. In the Narrow Gap Welding Process the filler weld metal must be deposited in a narrow slot formed between two thick metal plates which are to be welded. In practice the plates may be anywhere from two to six inches or more in thickness and when positioned for welding the gap between the two plates is ¼ inch. Because of the extremely narrow gap and the necessity of directing the filler wire to the bottom of the gap in order to lay welding beads progressively one over the other from alternate sides to develop a herringbone pattern of weld beads between the two plates, because of the necessity of making continuous good electrical contact with the filler wire as it is being fed to the area being welded and because of the extremely high temperature and violent environment of the welding arc, it has previously been found impossible to practice the Narrow Gap method for continuous periods of time, such as are required when it is necessary to produce a weld greater than three or four inches in length. Because of the high temperature developed in the gap area during the welding operation the portions of the torch which of necessity must extend to the bottom of the narrow gap would melt in spots and the copper contact tubes through which as much as 600 amperes must be transferred to the filler wire would expand and cause a condition of erratic contact. In addition to this, the thin layer of thermal and electrical insulation which was required in order to prevent electrical contact between the torch and the walls of the narrow gap soon became covered with weld spatter which became fastened securely to the ceramic coating so that soon the torch would jam in the gap because of the buildup of spatter on the torch. The present invention concerns a torch which is capable of functioning in the hostile environment surrounding the narrow gap welding torch during the welding operation.

The object of the present invention is to make possible the realization of an arc welding torch which allows one to carry out the narrow gap welding process.

Another object is to realize an electric arc welding torch which can function continuously in a narrow gap between two thick plates which are to be welded.

Another object is to realize a welding torch in which the contact tube provides good electrical contact continuously with mechanical stability during the welding of thick plates by the narrow gap process.

Another object of the invention is to provide an arc welding torch which will operate satisfactorily in the confined space required in the narrow gap welding process and which is provided with a means for preventing weld spatter from becoming securely attached to the torch.

Another object of the invention is to provide a welding torch for the narrow gap process which incorporates water cooling.

The figures attached to the specification illustrate one form which the invention may take.

FIG. 1 is a side view of the welding torch.

FIG. 2 is a section through the torch at AA.

FIG. 3 is an end view of the torch in the gap between two partially welded plates.

Figure 4:
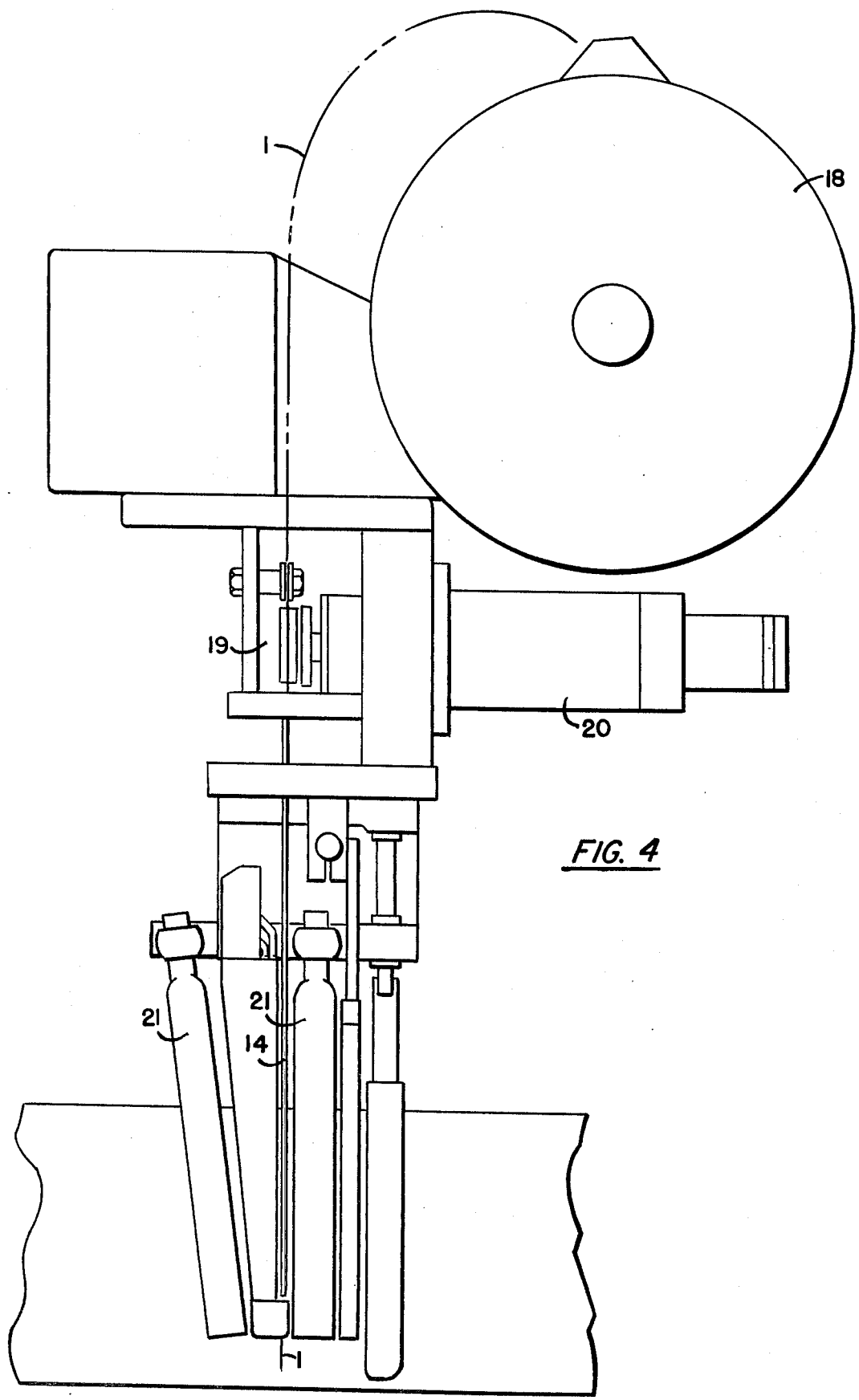
FIG. 4 illustrates the torch mounted on a welding carriage along with the accessory equipment.

The torch developed for narrow gap welding consists of an assembly provided with means for guiding and transferring the relatively high arc welding currents from a special tube to the filler wire which passes through the tube. Means are provided for removing the heat developed by the current passing through the torch and from the heat absorbed by the torch by virtue of its proximity to the extremely high temperature arc at the welding zone. The torch assembly provides means for conducting electrical energy through the tube and from the tube to the wire which makes sliding contact with the inner wall of the tube. The feed wire, prior to its entry into the contacting tube, is automatically formed to a desired radius and makes good contact with the inner wall of the tube 2 because of the spring action of the curved portion under strain within the tube. The tube 2 is made of molybdenum, a metal utilized because of its hardness and its high melting point. The molybdenum tube is surrounded by copper which forms the end piece 3 of the tube. The copper end piece 3 is brazed to a copper tube 4 which is provided in order to carry cooling water to the end of the torch. A steel stiffener 5 is brazed to the end of the torch and to the copper tubing and fastened to the copper supporting and connecting member 6. The ends of the copper cooling tube 4 are fastened into holes 7 provided in the supporting block 6, and means are provided whereby water may be circulated through the cooling tube 4. Mounting holes 8 are provided to allow fastening of the torch to a weld carriage assembly for automatically propelling the torch along the gap between the plates to be welded. The torch assembly is metallic and electrically conductive and is electrically connected to one of the output terminals of a welding power source. The parts being welded are connected to the second terminal of the power source. When welding is being performed the torch working in the confines of the narrow gap is in very close proximity to the work so that the danger of a short circuit between the torch body and the work exists. In order to prevent a short circuit an insulation is provided to keep the torch from electrically contacting the part being welded. This insulation consists of a coating of alumina 9 which is melted in a flame spray type device and is deposited on the metal end piece 3 of the torch. This type of insulation is required because of the very hostile environment (10 in FIG. 3) that exists around the welding arc which is close to the end of the torch in developing the torch it was discovered that it is essential that the water cooling must be circulated very close to the working end of the torch in order to keep the insulation cool and the insulation must be thin and in intimate contact with the water cooling channel to insure a long life for the assembly. An undercoating of sprayed metal 11 is necessary to insure adequate bonding of the alumina coating 9. The spatter 13 from the arc tends to adhere to the alumina coating 9 in areas adjacent to the hole through which the wire is passing. Mechanical removal of this spatter removes some of the alumina and eventually causes trouble by exposing bare metal areas of the torch to the part being welded. This inadequacy was overcome when it was discovered that a coating of finely divided graphite 12 dispersed in a aqueous solution painted over the insulating alumina provided a protective surface which does not allow much of the spatter to adhere and if any of the spatter does adhere it is not held very tenaciously and may be easily removed without removing a portion of the alumina. Furthermore, the graphite which may be inadvertently removed may easily be replaced by painting on a fresh coat of the graphite emulsion without removing the torch from the welding machine. This makes for a very practical operation inasmuch as the alumina coating, had it been removed, requires the removal of the torch from the welding machine, a thorough cleaning of the places to be sprayed, and a re-spraying at the spray bench utilizing the flame spray type device. The addition of the graphite coating to the torch makes for a long lasting easily maintained torch which makes the narrow gap process a practical one.

FIG. 4 is a side view of the welding torch assembly mounted on a welding carriage which is provided with all the accessories necessary to perform the Mig welding process. The welding electrode wire is pushed by the wire feed mechanism 19 which is driven by motor 20 through the guide tube 14 and enters the torch tip at 15. This guide tube 14 is not connected to the welding power source, electrical contact to the wire being made close to the exit side of the conducting tube 2. The guide tube 14, however, is connected to the power source through the electrode wire and must be insulated from electrical contact with the part being welded. This insulation is provided by means of an insulating sleeve (16) placed over the guide tube 14. The temperatures in this region are much lower than those found in the hostile environment surrounding the end of the torch so that a sleeve of simple organic insulating material may be utilized over the guide tube. The upper areas of the torch around the cooling tube 4 and the stiffener 5 are also in a relatively calm region and this part is insulated with organic heat shrinkable tubing 17 inasmuch as it is relatively far from the extremely high temperature spatter filled area immediately above the weld bead 18 being laid down. Flattened tubing 21 is provided on the assembly through which inert gas may be directed to the weld area so as to reduce the oxidation of the welded area.

The combination of the graphite coating over the refractory ceramic insulation, plus the water cooling means close to the source of heat and the contact tube fabricated of molybdenum, results in a Mig welding torch which may be used in confined spaces for long periods of time so as to allow practical use of the narrow gap process in the continuous and automatic production of large structures. This torch has made possible the rapid and reliable welding by automatic means of large pressure vessels, submarine hulls and other structures fabricated from metal plates having a thickness up to 8 inches.

The various features and advantages of this invention are thought to be clear from the above description. Other features and advantages may occur to those skilled in the art which may be achieved without departing from the scope of the present invention as defined in the following claims.

What I claim is:

1. A welding torch for practising the metal inert gas welding method within confined spaces comprising:
   an electrically conductive supporting member adapted for attachment to a welding machine carriage;
   a continuous length of heat and electricity conductive tubing folded upon itself with both ends engaging separate ports in the above mentioned supporting member;
   a copper end plate having a cut out portion into which the folded over end of the said tube is nested and fastened so that the end plate lies in a plane passing through the longitudinal axis of the said tubing;
   a second tubing of metal having a high melting point, hardness and wear resistance, press fitted within a hole formed in said end plate in close proximity to and in a direction essentially parallel to the said first tubing;
   a heat and electrical insulating material covering the said copper end plate;
   a coating of finely divided graphite particles covering the said heat and electrical insulating material;
   and a second rigid member to which the first mentioned supporting member and the said end plate are attached and held apart one from another.

2. A welding torch as in claim 1 in which the said second tubing is made of molybdenum.

3. A welding torch as in claim 1 in which the said insulating material is an adherent coating of alumina.

4. A welding torch as in claim 1 in which the coating over said insulating means is a coating of finely divided graphite which may be painted on from a solution of finely divided graphite particles dispersed in water.

5. A welding torch as in claim 1 in which a portion of the torch between the first supporting member and the end plate is covered with a heat shrinkable organic electrical insulating material.

6. A welding torch as in claim 1 which has a maximum thickness of 3/16 inch so as to allow welding in a ¼ inch gap.

7. A welding torch as in claim 1 supported on a welding carriage holding a wire feed mechanism.

* * * * *